J. A. Smith.
Weather Strip.
No. 56,813.  Patented Jan. 31, 1866.
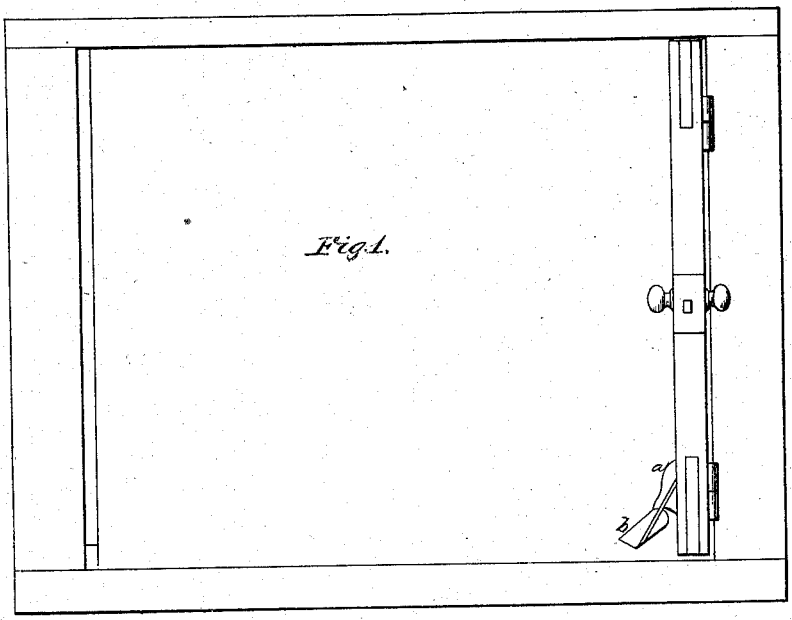
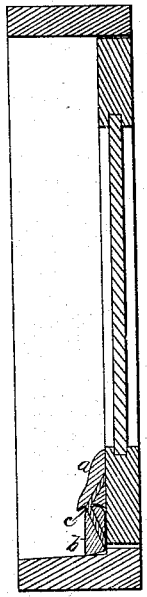
Witnesses:
S. B. Kidder
M. W. Frothingham
Inventor:
John A. Smith
By his Attys
Crosby & Gould

UNITED STATES PATENT OFFICE.

JOHN A. SMITH, OF WAUPACA, WISCONSIN.

IMPROVED WEATHER-STRIP FOR DOORS.

Specification forming part of Letters Patent No. 56,813, dated July 31, 1866.

*To all whom it may concern:*

Be it known that I, JOHN A. SMITH, of the town and county of Waupaca, in the State of Wisconsin, have invented certain new and useful Improvements in Threshold Weather-Strips for Swinging Doors and Windows; and I do hereby declare that the following, taken in connection with the drawings which accompany and form part of this specification, is a description of my invention sufficient to enable those skilled in the art to practice it.

My invention relates to improvements in the details of construction of such weather-strips as are used on the bottoms of swinging doors and windows to close the crack or opening between the door and its threshold, and thereby prevent ingress of dust, cold wind, rain, and snow, while permitting the door to swing freely over carpets, mats, &c.

My invention consists in such a weather-strip made of two parts, with the lower edge of the upper part grooved concavely, while the upper edge of the lower part is made convex, with said convexity fitting into said concavity, when the two parts so made are united by means of rubber in such a manner that the rubber fills the functions both of hinges and springs.

In the drawings, Figure 1 shows, in elevation, a door-frame with its door wide open, and with one of my improved weather-strips attached to the bottom thereof, illustrating the position of the two parts of the strip as they appear with an open door. Fig. 2 is a section taken through the door-frame and the door when closed, illustrating the position of the two parts of the strip under such conditions.

$a$ is the upper part of the strip, and $b$ the lower part. In joining the said parts by pieces or strips of rubber $c$, slots or mortises are made through each part $a$ and $b$, so that they come into line with each other when the pieces have that position relative to each other that it is desirable they should have when the door is open. Through or into these mortises or slots the rubber strips $c$ are drawn with the convex and concave edges of $a$ and $b$ in contact and with the said slots or mortises in line, the rubber being then secured in the mortises or slots. The door or window being closed, the weather-strip, in the position shown in Fig. 2, is fastened to the bottom thereof, with the lower edge of $b$ abutting on the threshold, a stop being arranged on the side of the door-frame to keep the spring of the rubber hinges from making the piece $b$ fly outward and assuming the position shown as occupied by it in Fig. 1. This stop is at the end of the strip $b$ farthest from the hinges of the door, and when the door is opened the part $b$, being freed thereby from the control of the stop, is elevated by the spring of the rubber hinges, tending to bring the parts into the position in which they were put together in the manufacture, and in this condition the weather-strip swings with the door clear of carpets, mats, &c., though when the door is closed its lower edge rests upon the threshold.

In cheapness, in ease and certainty of action, and in cheapness and ease of repair this weather-strip is superior to all that have come under my observation.

I am aware of the construction shown in Spicer's patent of November 22, 1864, and in Mathewson's patent of May 16, 1848. My construction, however, differs from these and all others in that, instead of employing, in combination with the hinges upon which the strip is hung, springs for raising the strip when the door is open, I apply the strip by rubber hinges in such manner that they answer the twofold purpose of hinges upon which the strip is hung and swings and of springs for raising the strip and maintaining it in raised position when the door is open.

I claim—

A threshold weather-strip made of the two parts $a$ and $b$, with edges convex and concave, as described, when united by hinges operating also as springs, substantially as specified.

JOHN A. SMITH.

Witnesses:
J. B. CROSBY,
M. W. FROTHINGHAM.